(12) United States Patent
Banning et al.

(10) Patent No.: US 8,549,266 B2
(45) Date of Patent: *Oct. 1, 2013

(54) SYSTEM AND METHOD OF INSTRUCTION MODIFICATION

(76) Inventors: John P. Banning, Sunnyvale, CA (US); Eric Hao, Cupertino, CA (US); Brett Coon, Milpitas, CA (US)

( * ) Notice: Subject to any disclaimer, the term of this patent is extended or adjusted under 35 U.S.C. 154(b) by 51 days.

This patent is subject to a terminal disclaimer.

(21) Appl. No.: 13/155,291

(22) Filed: Jun. 7, 2011

(65) Prior Publication Data

US 2011/0238961 A1     Sep. 29, 2011

Related U.S. Application Data

(60) Continuation of application No. 12/698,809, filed on Feb. 2, 2010, now Pat. No. 7,984,277, which is a division of application No. 10/672,790, filed on Sep. 26, 2003, now Pat. No. 7,698,539.

(60) Provisional application No. 60/488,222, filed on Jul. 16, 2003.

(51) Int. Cl.
*G06F 9/30*     (2006.01)

(52) U.S. Cl.
USPC .......................................... 712/226; 712/213

(58) Field of Classification Search
None
See application file for complete search history.

(56) References Cited

U.S. PATENT DOCUMENTS

| | | | |
|---|---|---|---|
| 4,050,058 A | 9/1977 | Garlic | |
| 4,199,811 A | 4/1980 | Borgerson et al. | |
| 4,259,718 A | 3/1981 | Kaman et al. | |
| 4,312,036 A | 1/1982 | Porter et al. | |
| 4,314,331 A | 2/1982 | Porter et al. | |
| 4,342,078 A | 7/1982 | Tredennick et al. | |
| 4,371,908 A | 2/1983 | Andow et al. | |
| 4,371,927 A | 2/1983 | Wilhite et al. | |
| 4,376,976 A | 3/1983 | Lahti et al. | |
| 4,394,736 A | 7/1983 | Bernstein et al. | |
| 4,399,505 A | 8/1983 | Druke et al. | |
| 4,491,908 A | 1/1985 | Woods et al. | |
| 4,591,972 A | 5/1986 | Guyer et al. | |
| 4,654,781 A | 3/1987 | Schwartz et al. | |
| 4,745,544 A | 5/1988 | Renner et al. | |
| 4,763,246 A | 8/1988 | Holt et al. | |
| 4,825,363 A | 4/1989 | Baumann et al. | |

(Continued)

OTHER PUBLICATIONS

Hennessy, John L. et al., "Computer Architecture A Quantitative Approach," Morgan Kaufmann Publishers, Inc., 2nd Ed., Jan. 1996, pp. 130 and 284-289.

(Continued)

*Primary Examiner* — Eric Coleman

(57) ABSTRACT

A method and system of instruction modification. A first machine language instruction, which may comprise a plurality of discrete instructions, is fetched. Responsive to a trigger pattern in the first machine language instruction, a segment of the first machine language instruction is modified. Information can be substituted into the segment based on specifics outlined in the trigger pattern. Alternatively, information can be combined with the segment via logical and/or arithmetic operations. Modification of the segment produces a second machine language instruction that is executed by units of the processor. In one embodiment, information may be taken from a queue and used to replace data from the segment. How information is taken from the queue and how the information so taken is used to replace fields of the segment are defined by the trigger pattern.

20 Claims, 6 Drawing Sheets

(56) References Cited

U.S. PATENT DOCUMENTS

| | | | |
|---|---|---|---|
| 4,875,160 | A | 10/1989 | Brown, III |
| 4,928,223 | A | 5/1990 | Dao et al. |
| 4,933,847 | A | 6/1990 | Chau et al. |
| 5,005,118 | A | 4/1991 | Lenoski |
| 5,057,837 | A | 10/1991 | Colwell et al. |
| 5,101,344 | A | 3/1992 | Bonet et al. |
| 5,115,500 | A | 5/1992 | Larsen |
| 5,129,066 | A | 7/1992 | Schmookler |
| 5,129,067 | A | 7/1992 | Johnson |
| 5,153,881 | A | 10/1992 | Bruckert et al. |
| 5,168,571 | A | 12/1992 | Hoover et al. |
| 5,179,680 | A | 1/1993 | Colwell et al. |
| 5,202,967 | A | 4/1993 | Matsuzaki et al. |
| 5,220,656 | A | 6/1993 | Itomitsu et al. |
| 5,222,244 | A | 6/1993 | Carbine et al. |
| 5,233,694 | A | 8/1993 | Hotta et al. |
| 5,235,686 | A | 8/1993 | Bosshart |
| 5,291,494 | A | 3/1994 | Bruckert et al. |
| 5,293,592 | A | 3/1994 | Fu et al. |
| 5,301,341 | A | 4/1994 | Vassiliadis et al. |
| 5,325,495 | A | 6/1994 | McLellan |
| 5,341,497 | A | 8/1994 | Younger |
| 5,371,844 | A | 12/1994 | Andrew et al. |
| 5,418,970 | A | 5/1995 | Gifford |
| 5,485,629 | A | 1/1996 | Dulong |
| 5,555,428 | A | 9/1996 | Radigan et al. |
| 5,559,974 | A | 9/1996 | Boggs et al. |
| 5,566,298 | A | 10/1996 | Boggs et al. |
| 5,649,135 | A | 7/1997 | Pechanek et al. |
| 5,784,585 | A | 7/1998 | Denman |
| 5,832,205 | A | 11/1998 | Kelly et al. |
| 5,857,103 | A | 1/1999 | Grove |
| 5,862,398 | A | 1/1999 | Hampapuram et al. |
| 5,867,681 | A | 2/1999 | Worrell et al. |
| 5,925,123 | A | 7/1999 | Tremblay et al. |
| 5,974,240 | A * | 10/1999 | Chan .................. 712/218 |
| 5,974,539 | A | 10/1999 | Guttag et al. |
| 6,041,399 | A | 3/2000 | Terada et al. |
| 6,044,450 | A | 3/2000 | Tsushima et al. |
| 6,065,106 | A | 5/2000 | Deao et al. |
| 6,092,185 | A | 7/2000 | Slegel et al. |
| 6,101,592 | A | 8/2000 | Pechanek et al. |
| 6,112,299 | A | 8/2000 | Ebcioglu et al. |
| 6,202,142 | B1 | 3/2001 | Narayan et al. |
| 6,202,143 | B1 | 3/2001 | Rim |
| 6,230,260 | B1 | 5/2001 | Luick |
| 6,282,633 | B1 | 8/2001 | Killian et al. |
| 6,317,872 | B1 | 11/2001 | Gee et al. |
| 6,343,373 | B1 | 1/2002 | Koizumi et al. |
| 6,397,379 | B1 | 5/2002 | Yates, Jr. et al. |
| 6,442,701 | B1 | 8/2002 | Hurd |
| 6,453,407 | B1 | 9/2002 | Lavi et al. |
| 6,571,386 | B1 | 5/2003 | Figurin et al. |
| 6,618,804 | B1 | 9/2003 | Steele, Jr. et al. |
| 6,658,551 | B1 | 12/2003 | Berenbaum et al. |
| 6,871,274 | B2 | 3/2005 | Nunomura |
| 2004/0230777 | A1 | 11/2004 | Busaba et al. |

OTHER PUBLICATIONS

Ozer et al., "A Fast Interrupt Handling Scheme for VLIW Processors," Proceedings of International Conference on Parallel Architectures and Compilation Techniques, Oct. 12, 1998, pp. 136-141.

Colwell et al., "A VLIW architecture for a Trace Scheduling Compiler," ACM, Jan. 1987, pp. 180-192.

Cohn et al., "Architecture and Compiler Tradeoffs for a Long Instruction Word Processor," ACM, Jan. 1989, Whole Document.

Nakatani et al., "'Combining' as a Compilation Technique for VLIW architectures," ACM, Jan. 1990, pp. 43-55.

Ray, G. A., "Core-Based RNS ALU with Customized Instructions," IEEE Ninth Annual International Conference on Computers and Communications, Mar. 21, 1990, p. 891.

Patterson et al., "RISC I: A Reduced Instruction Set VLSI Computer," ISCA Proceedings of the 8th Annual Symposium on Computer Architecture, Jan. 1981, pp. 216-230.

TRANSMETA P2000 (project name: Fred), "Instruction Set Architecture and Programmer's Reference Manual," Version 1.01, Jan. 31, 2001, pp. 801-804.

Stallings, W., "Data and Computer Communications," Third Edition. Macmillan Publishing Company. New York, New York, Jan. 1991, pp. 184-185, 193, and 201.

Popescu, Val et al., "The Metaflow Architecture," IEEE, Jun. 1991, pp. 10-13 and 63-73.

"Enterprise Systems Architecture/390 Principles of Operation," Eight Edition, IBM, Jul. 2001, pp. 9-1 to 9-4, 9-8 to 9-9, and 7-1 to 7-6.

Johnson, M., "Superscalar Microprocessor Design," PTR Prentice-Hall, In., A Pearson Education Company Upper Saddle River, NJ 07458, Jan. 1991, Whole Document.

* cited by examiner

FIGURE 6

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S | type 10 | | | opcode 011000 | | | | | A | MO | | MOdata | | | MSZ | | MSZdata | | | MS2 | | MS2data | | | MS1 | MS1 data | | | MD | MDdata | | R 0 |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S | type 10 | | | opcode 011001 | | | | | rsvd 0 | MO | | MOdata | | | MS2 | | MS2 data | | | MS1 | MS1 data | | MD | MD data | | | reserved 0 | | | | |

| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|
| S | type 10 | | | opcode 011000 | | | | | MO | MI | reserved1 0 | | | | | | | | | | | | | | | MD | | | reserved0 0 | | |

801, 802, 803

800

SYSTEM AND METHOD OF INSTRUCTION MODIFICATION

RELATED APPLICATIONS

This is a Continuation Application of commonly owned, co-pending U.S. patent application Ser. No. 12/698,809, now U.S. Pat. No. 7,984,277, filed Feb. 2, 2010, entitled "System and Method of Instruction Modification" to Banning et al., which is hereby incorporated by reference in its entirety, which in turn was a Divisional application of U.S. patent application Ser. No. 10/672,790, now U.S. Pat. No. 7,698,539, filed Sep. 26, 2003, entitled "System and Method of Instruction Modification" to Banning et al., which is hereby incorporated by reference in its entirety, which in turn claimed benefit of U.S. Provisional Patent Application Ser. No. 60/488,222, filed Jul. 16, 2003, entitled "System and Method of Instruction Modification" to Banning and Hao, which is hereby incorporated by reference in its entirety.

FIELD OF THE INVENTION

Embodiments in accordance with the present invention relate to systems and methods of instruction modification.

BACKGROUND

The term "microcode" is generally understood, and is used herein, to refer to or to describe the lowest-level instructions that directly control a computer processor. For example, a single machine-language instruction typically translates into several microcode instructions. Microcode generally has a direct correspondence between a bit location and a particular set of gates. It is to be appreciated that microcode is distinct and quite different from firmware. It is further appreciated that many microprocessors, for example, reduced instruction set computers (RISC) microprocessors, may not use microcode.

The term "machine language" is generally understood to refer to or to describe another level of computer instructions, above microcode. Machine language instructions generally correspond directly to assembly language statements.

The term "very long instruction word (VLIW)" is generally understood to refer to or to describe computer architectures that implement a form of instruction level parallelism. Similar to superscalar architectures, such computers typically use several execution units of the same type (e.g. two multipliers), which enable the processor to execute several instructions at the same time (e.g., two multiplications). The term can also refer to instructions used by such processors.

SUMMARY OF THE INVENTION

A method and system of instruction modification are disclosed, e.g., for use in a VLIW processor. A first machine language instruction, which may comprise a plurality of discrete instructions, is fetched. Responsive to a trigger pattern in the first machine language instruction, a segment of the first machine language instruction is modified. Information can be substituted into the segment based on specifics outlined in the trigger pattern. Alternatively, information can be combined with the segment via logical and/or arithmetic operations. Modification of the segment produces a second machine language instruction that is executed by units of the processor. In one embodiment, information may be taken from a queue and used to replace data from the segment. How information is taken from the queue and how the information so taken is used to replace fields of the segment are defined by the trigger pattern.

BRIEF DESCRIPTION OF THE DRAWINGS

FIG. 6 illustrates an exemplary encoding of an EXECA1 packet, in accordance with embodiments of the present invention.

FIG. 7 illustrates an exemplary encoding of an EXECF0 packet, in accordance with embodiments of the present invention.

FIG. 8 illustrates an exemplary encoding of an EXECM0 packet, in accordance with embodiments of the present invention.

DETAILED DESCRIPTION OF THE INVENTION

Figure 1:
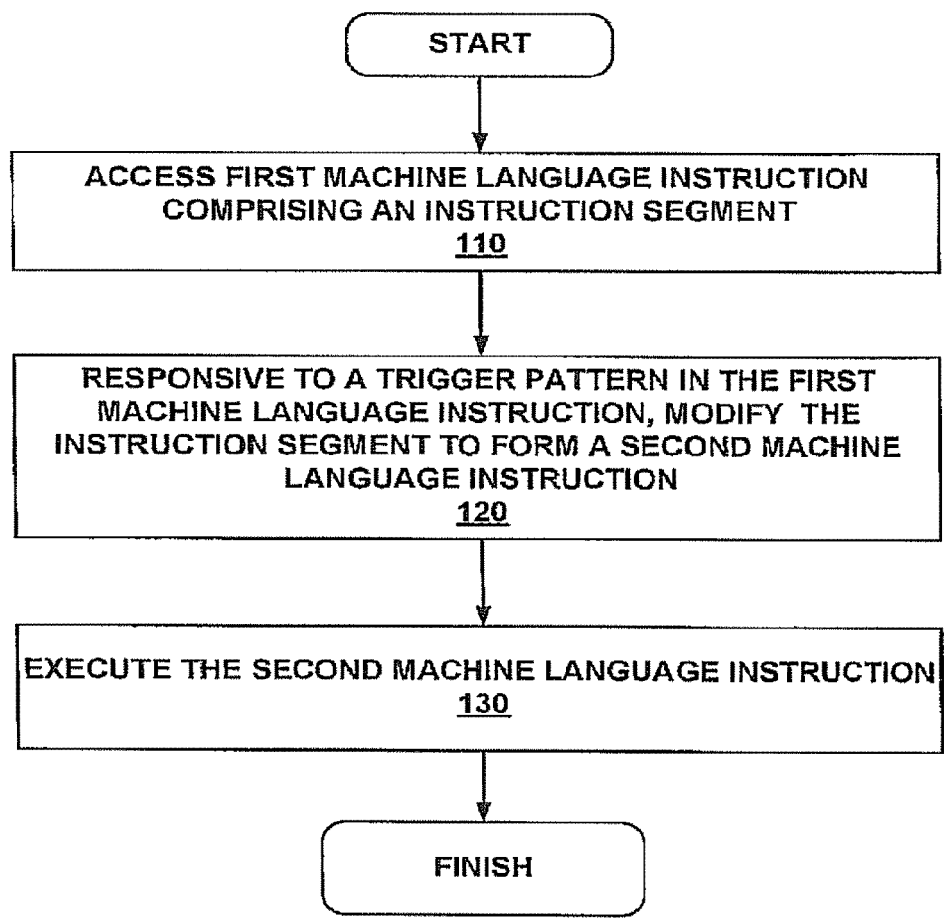
FIG. 1 illustrates a flow chart of a method for modifying a processor instruction, in accordance with embodiments of the present invention.

In the following detailed description of embodiments of the present invention, system and method of instruction modification, numerous specific details are set forth in order to provide a thorough understanding of the present invention. However, it will be recognized by one skilled in the art that the present invention may be practiced without these specific details or with equivalents thereof. In other instances, well-known methods, procedures, components, and circuits have not been described in detail as not to unnecessarily obscure aspects of the present invention.

Notation and Nomenclature

Some portions of the detailed descriptions which follow (e.g., processes 100, 200 and 500) are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "fetching" or "modifying" or "repeating" or "executing" or "advancing" or "comparing" or "processing" or "computing" or "translating" or "calculating" or "determining" or "excluding" or "displaying" or "recognizing" or "generating" or "assigning" or "initiating" or "collecting" or "transferring" or "switching" or "accessing" or "retrieving" or "receiving" or "issuing" or "measuring" or "conveying" or "sending" or "dispatching" or "advancing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

System and Method of Instruction Modification

Embodiments of the present invention are described in the context of design and operation of microprocessors, e.g., integrated circuit processor elements.

FIG. 1 illustrates a flow chart of a method 100 for modifying a processor instruction, in accordance with embodiments of the present invention. In block 110, a first machine language instruction, e.g., a VLIW instruction, comprising an instruction segment is fetched. It is appreciated that a machine language instruction is distinct from microcode, and may contain several instruction segments therein. For example, an exemplary first machine language instruction can be "1111100111000100." An instruction segment can be any portion of a machine language instruction, for example the last four bits ("0100"). Instruction segments generally are contiguous and shorter than the machine language instruction. It is appreciated however, that any subset of a machine language instruction, including non-contiguous portions and the entire instruction, can form an instruction segment in accordance with embodiments of the present invention.

In block 120, the instruction segment is modified in response to the presence of a trigger pattern in the instruction. For example, a bit pattern of "1111" comprising the first four bits of exemplary instruction "1111100111000100," can form a trigger pattern, indicating that the instruction segment is to be modified. It is to be appreciated that any arbitrary pattern of arbitrary length can comprise a trigger pattern in accordance with embodiments of the present invention. In addition, multiple patterns can serve as different types of triggers, causing similar and/or different modifications to take place. For example, a first trigger patterns can cause a logical operation to modify an instruction segment and a second trigger pattern can cause an arithmetic operation to be performed on an instruction segment. Further, a machine language instruction can comprise a plurality of trigger patterns and a trigger pattern need not be in a specific location within a machine language instruction.

In response to a trigger pattern in the first machine language instruction, the instruction segment is modified. For example, the exemplary last four bits can be logically combined with a bit pattern, e.g., fixed or stored in a register. For example, the instruction segment can be logically XORed with "1010." Examples of modifications of an instruction segment include without limitation logical operations, arithmetic operations, substitution, rotation and convolution. The modification of an instruction segment of the first machine language instruction forms a second machine language instruction.

In accordance with embodiments of the present invention, an instruction segment can comprise a trigger pattern. For example, the exemplary trigger pattern "1111" comprising the first four bits of an exemplary instruction can be modified to form a second machine language instruction.

Still referring to FIG. 1, in block 130, the second machine language instruction is executed. It is appreciated that, in general, a fetch operation does not need to be performed to retrieve the second machine language instruction. It is appreciated that the execution process utilized to execute the second machine language instruction should not respond to an instruction modification trigger pattern. It is appreciated that process 100 may be executed by internal components or units of a microprocessor, or process 100 can be partially or completely performed by software.

In accordance with embodiments of the present invention, instruction modification information can be used in block 120 to control modification of the instruction segment. Instruction modification information can control a variety of different modifications to instruction segments. For example, a first instruction modification information value accessed within block 120 can cause a logical operation to modify the instruction segment, and a second instruction modification information value accessed within block 120 can cause an arithmetic operation to modify the instruction segment.

Information for modifying the machine language instruction may originate from a memory or queue within the processor. In accordance with embodiments of the present invention, a plurality of instruction modification information can be contained within a data structure, for example a sequence of registers or a queue. Associated with execution of block 120, a head of queue pointer, for example, may be updated to point to a next instruction modification information. This novel data structure enables modification of multiple machine language instructions without a need for executing machine language instructions to change instruction modification information values. Use of such a data structure with methods described herein can facilitate pipelined operation of a processor.

For example, a first pass through method 100 can utilize first instruction modification information. A subsequent pass through method 100 can utilize second instruction modification information without executing a machine language instruction, e.g., writing to a register, to change the instruction modification information.

Figure 2:
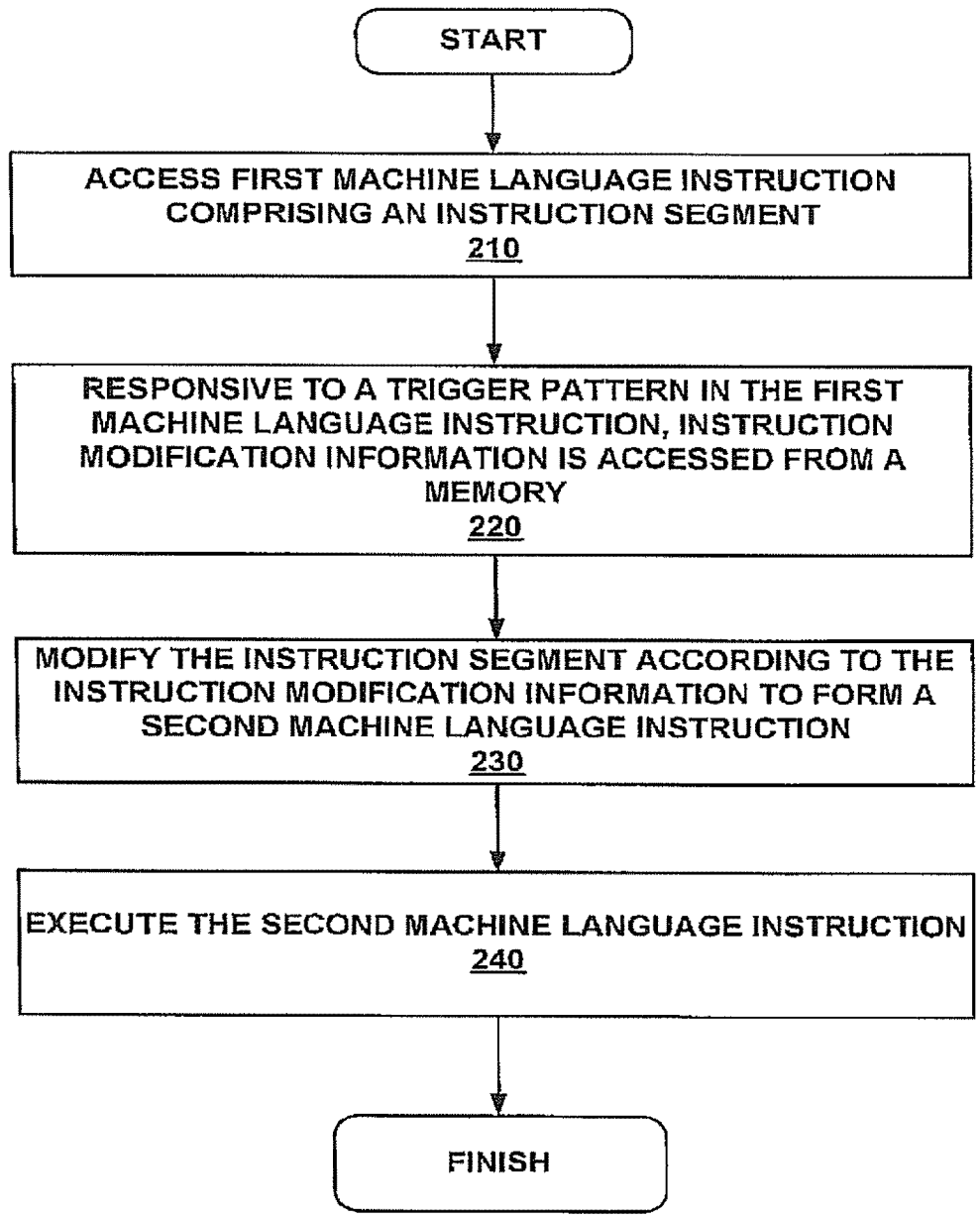
FIG. 2 illustrates a flow chart of a method for modifying a processor instruction that utilizes a memory, e.g., a queue, to obtain replacement information, in accordance with embodiments of the present invention.

FIG. 2 illustrates a flow chart of a method 200 for modifying a processor instruction, in accordance with embodiments of the present invention. As discussed above, process 200 may be executed by internal components or units of a microprocessor, or process 200 can be partially or completely performed by software. In block 210, a first machine language instruction comprising an instruction segment is fetched by the microprocessor. The machine language instruction may comprise several instruction segments.

In block 220, instruction modification information is accessed from a memory in response to a trigger pattern in said first machine language instruction. The instruction modification information describes the modifications to be made to the instruction segment. For example, instruction modification information can comprise information to be substituted into an instruction segment. In accordance with other embodiments of the present invention, instruction modification information can comprise information to be utilized in an operation with contents of an instruction segment, e.g., as part of a logical operation. The instruction segment may be associated with a particular execution unit of the microprocessor, e.g., a memory unit, a fixed point ALU unit or a floating point unit, branch unit, etc. In accordance with still other embodiments of the present invention, instruction modification information can comprise commands to instruct a processor to modify an instruction segment. For example, a command within instruction modification information can instruct a processor to perform a circular rotation of bits of an instruction segment.

In block 230, the instruction segment is modified according to the instruction modification information to form a second machine language instruction. In block 240, the second machine language instruction is executed.

In accordance with embodiments of the present invention, a plurality of instruction modification information can be stored in a data structure, for example, a queue. The use of such a data structure can enable multiple sets of instruction modification information to be loaded into the data structure and then utilized in sequence. This enables a sequence of machine language instructions to be modified and executed without burdensome delays associated with having to interleave execution of additional machine language instructions to implement changes to modification information between execution of the desired machine language instructions.

Figure 3:
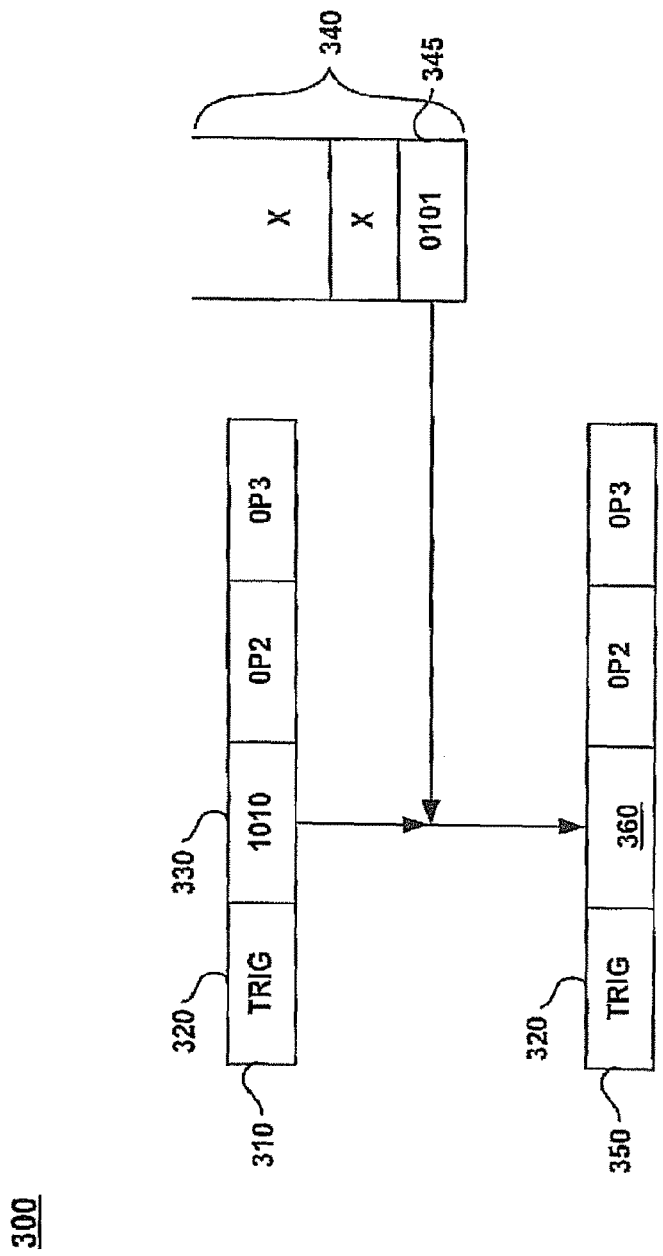
FIG. 3 illustrates an exemplary data flow diagram illustrating modification of an instruction, in accordance with embodiments of the present invention.

FIG. 3 illustrates an exemplary data flow diagram 300 illustrating modification of an instruction, in accordance with embodiments of the present invention.

Instruction 310 comprises a trigger pattern 320, an instruction segment 330 and two other instruction segments called atoms "op2" and "op3." Instruction segment 330 is also an atom of instruction 310. Such atoms may be referred to as atomic portions of instruction 310. Atom 330 comprises a bit pattern "1010." Instruction 310 is typically fetched from a memory or cache data structure by a fetch unit of a processor.

Responsive to trigger pattern 320, instruction segment modification information 345 is accessed from queue 340. The sections of the data taken from the queue can be directed and defined by the trigger. Instruction segment modification information 345 is utilized to modify instruction segment 330. The modification of instruction segment 330 produces a new instruction segment 360 within new instruction 350. The particular portion of the segment that became modified can also be defined within the trigger.

Figure 4:
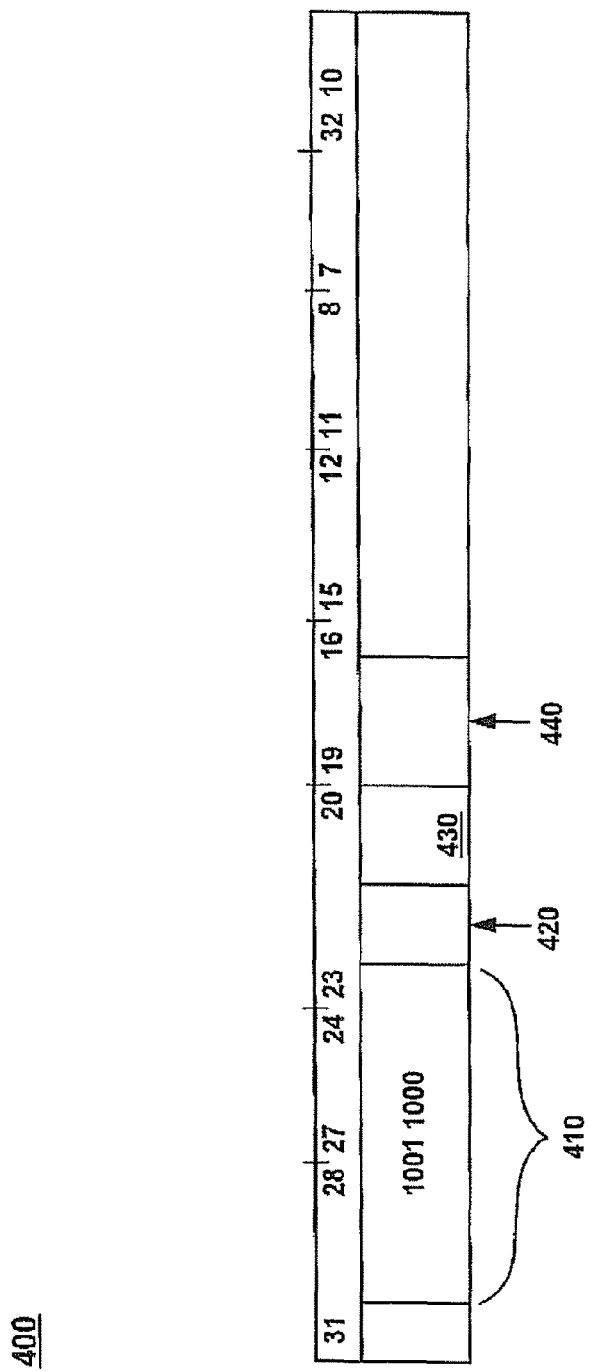
FIG. 4 illustrates an exemplary encoding of an instruction modification command packet, in accordance with embodiments of the present invention.

FIG. 4 illustrates an exemplary encoding of an instruction modification command packet 400, in accordance with embodiments of the present invention. Packet 400 comprises 32 bits divided into multiple fields and is typically one element of a very long word instruction (VLIW). Bits 30-23 of packet 400 comprise a trigger pattern 410 that can be recognized by a processor and initiate modification of an instruction.

Packet 400 corresponds to a specific instruction segment located within the same instruction as packet 400. Packet 400 specifies that some fields and sub fields of the instruction segment are to be substituted with fields from the queue of instruction modification information. Packet 400 can optionally specify that the queue of instruction modification information is to be advanced after the data at the front of the queue has been utilized.

Packet 400 and other such packets comprising instruction modification commands are generally associated with specific types of instruction segments. For example, a first type of instruction modification command packet can be associated with fixed point arithmetic logic unit (ALU) instruction segments. A second type of instruction modification command packet can be associated with floating point unit (FPU) instruction segments. A third type of instruction modification command packet can be associated with memory load/store unit (MEM) instruction segments. A fourth type of instruction modification packet can be associated with branch unit instruction segments (BR). Fields within instruction modification commands can vary from the example of packet 400 to correspond to the structure of associated instruction segments.

Exemplary instruction modification command packet 400 comprises a control bit 420 (bit 22) that specifies that the instruction modification information queue is to be advanced after the instruction segment is modified.

If all of the modifier fields in packet 400 specify "no editing" and bit 420 is "0," then no modifications will be made to the instruction comprising packet 400. This can be a useful method of creating a low power "NOP" or "no operation." NOPs are generally used to consume clock cycles with no other change in state of a processor.

Field 430 (bits 21-20) specifies whether the opcode of the instruction segment is to be edited and how. When an edit is to take place, field 440 (bits 19-17) specifies the position of the replacement field within the instruction modification information. Field 430 can specify at least three different options. A value of zero in field 430 specifies that the opcode of the instruction segment is not to be modified. A value of one in field 430 specifies that bits 24 and 23 of the instruction segment are to be replaced with bits of instruction modification information. A value of three in field 430 specifies that bits 26 through 23 of the instruction segment are to be replaced with bits of instruction modification information.

Field 440 specifies the bit position of the replacement field within the instruction modification information. It is ignored if the field 430 specifies no edit. Otherwise, the bit position of the least significant bit of the replacement field in the datum at the head of the instruction modification information queue is the value of field 440 times two. For example, if field 430 specifies a 2-bit replacement, and field 440 contains the value 6, the result is the bits 24-23 of the instruction segment are replaced by bits 13-12 of the instruction modification information at the head of the queue.

Other portions of packet 400 can comprise similar pairings of instruction segment field to be modified with information on how to modify the specified field. It is appreciated that fields to be modified and/or information of how to modify a specified field will, in general, vary according to the type of instruction segment to be modified.

Figure 5:
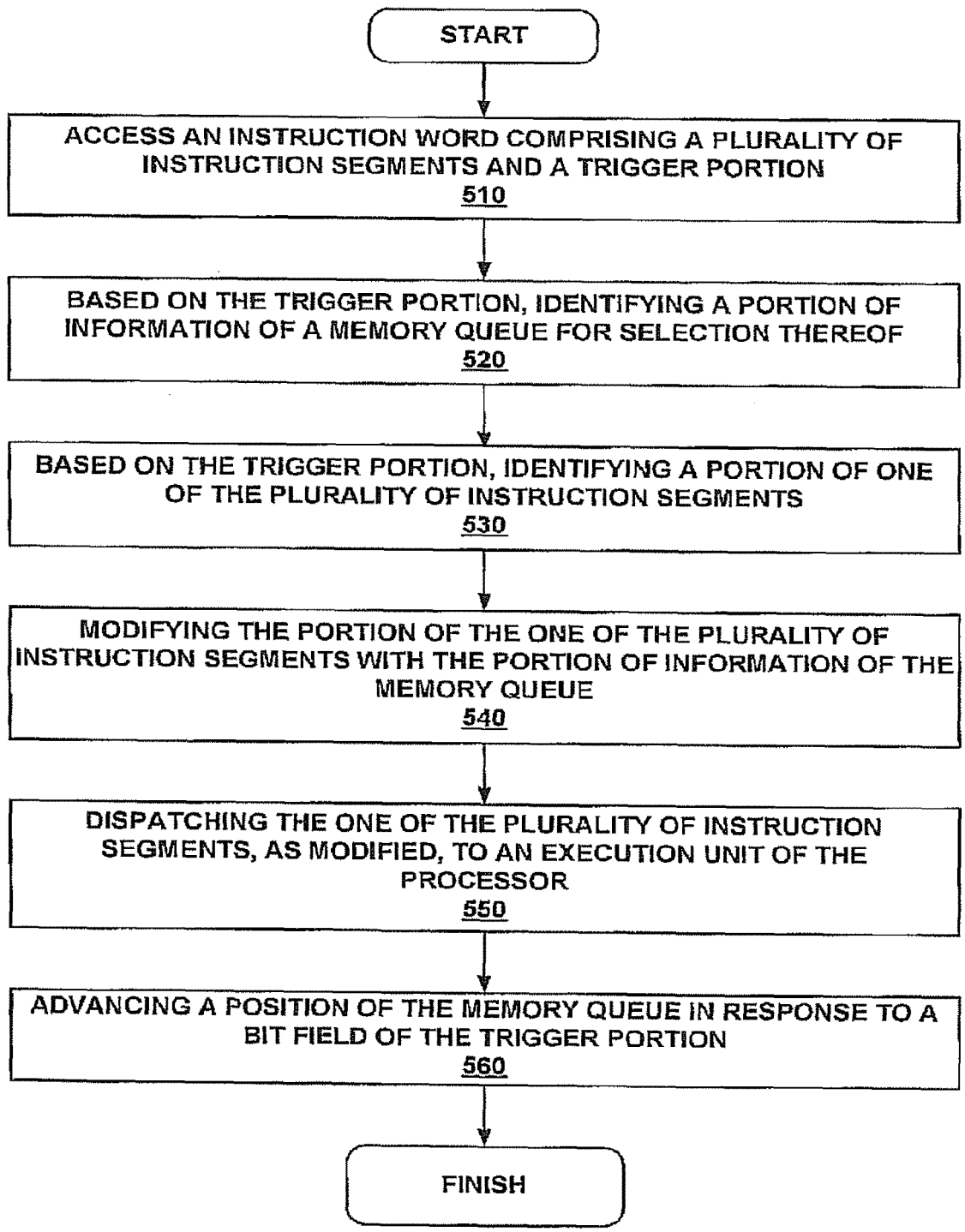
FIG. 5 illustrates a method of executing an instruction word of a processor, in accordance with embodiments of the present invention.

FIG. 5 illustrates a method 500 of executing an instruction word of a processor, in accordance with embodiments of the present invention. The instruction word can be a very long instruction word (VLIW).

In block 510, an instruction word comprising a plurality of instruction segments and a trigger portion is accessed. In block 520, a portion of information of a memory queue is identified based on the trigger portion.

In block 530, a portion of one of said plurality of instruction segments is identified based on the trigger portion. In block 540, the portion of the one of the plurality of instruction segments is modified with the portion of information of the memory queue.

In block 550, the one of the plurality of instruction segments, as modified, is dispatched to an execution unit of the processor. In optional block 560, a position of the memory queue is advanced in response to a bit field of the trigger portion. It is appreciated that such a bit field need not be present in a trigger portion in accordance with embodiments of the present invention.

An exemplary implementation of embodiments in accordance with the present invention is now presented.

An "exec unit" of a processor allows software to edit an otherwise static instruction stream in a dynamic and controlled manner by changing selected bit fields of selected template atoms just before they are issued into the main execution pipeline. The instruction edits are temporary and are used only for a single execution of the edited instruction.

One benefit of such a capability is the ability to reduce the code size of a processor emulator. By using on-the-fly instruction modification, it is possible to use a single static code sequence as a template for a class of instructions of the target processor, e.g., register to register instructions, for multiple different operations, e.g., add or subtract. The same template can be used for differing operand sizes, e.g., byte, word, double word, etc., and different source and destination registers.

Software can pair an "exec" packet with a to-be-edited atom, hereinafter called a "template atom." The exec packet statically specifies which bit field(s) in the template atom should be edited. Data taken from a queue, the "exec pipe," in turn, dynamically indicate how each bit field should be edited. For example, an exec packet may indicate that the opcode field of the template atom is to be replaced. The actual value for the new opcode bit(s) will be taken from the exec pipe at the time that the template atom enters the issue state of the execution pipeline.

The exec pipe can be a five-entry first in, first out (FIFO) queue. Generally, each entry can be 16 bits wide. Entries are inserted at the tail end of the exec pipe by performing write operations to mapped registers. Exec packets use the entry at the head of the exec pipe.

In this example, there are three different exec packets: EXECA1, EXECM0 and EXECF0, which edit the ALU1, MEM0 and FPU0 template atoms (model instructions), respectively. Each packet has different options, corresponding to different requirements and capabilities of the target instructions. In general, each different exec packet edits different parts of the corresponding template atoms.

In general, modifications to the template atom are a straight-forward substitution of specified bits from the head of the exec pipe into the specified field(s) of the template atom. When editing register source or destination fields in the template atom, a slightly more complicated operation takes place. The exec packet selects a 4-bit value from the 16 bits at the head of the exec pipe. The lower 3 bits of the selected value are simply copied in to the lower 3 bits of the register field. The top bit of the selected value, however, is logical ORed into the top 3 bits of the register field. This allows the atom edited to either preserver the top three bits of the template atom's register specifier, or forcibly select one of the highest numbered registers (the highest eight registers, controlled by the top three bits.

FIG. 6 illustrates an exemplary encoding 600 of an EXECA1 packet, in accordance with embodiments of the present invention.

EXECA1 is a packet that encodes editing instruction for the ALU1 atom. EXECA1 specifies that some fields and sub fields of the ALU1 atom are to be substituted with fields from the 16-bit datum at the head of the exec pipe. In addition, the EXECA1 atom can specify that the exec pipe is to be advanced after the data at the head of the pipe has been used.

The edits of the ALU1 atom are performed in the front end of the execution pipe. The ALU1 unit is not aware that an atom has been edited in any way. It is appreciated, however, that given an execution pipeline (a common structure and method in high performance processors), there is a non-negligible latency between writing into the execution pipeline and being able to use the just-written data for edits. This is a significant benefit of a pipe, in comparison to a register. Often times, the data for successive edits can all be inserted in sequence and then extracted and used in sequence, increasing the overall throughput and decreasing the overall latency over a single-register implementation.

If there is no ALU1 atom in the same instruction as the EXECA1 packet, the EXECA1 packet has no effect other than possible advancing the exec pipe, and can generally consume very little power, making it a good padding options.

If all of the modifier fields in the EXECA1 packet specify "no editing" and the A (601) bit is 0, the EXECA1 packet is a low power no operation (NOP).

Bit A (601) of the EXECA1 packet specifies that the exec pipe should be advanced at the end of this instruction. Any edits specified by the same EXECA1 packet take place using the data at the head of the exec pipe before it is advanced.

Field MO (602) specifies whether the opcode of the ALU1 atom should be edited and how. When an edit is to take place, field MOdata (603) specifies the position of the replacement field within the exec pipe data. Field MO (602) can specify three different options, as shown in table 1, below:

TABLE 1

Field MO

| Value | Action |
|---|---|
| 0 | Do not edit the ALU1 atom opcode |
| 1 | Replace bits 24:23 of the ALU1 atom opcode with bits from the exec pipe |
| 3 | Replace bits 26:23 of the ALU1 atom opcode with bits from the exec pipe |

Field MOdata (603) specifies the bit position of the replacement field within the exec pipe data. It is ignored if the field MO (602) requests no edit. Otherwise, the bit position of the least significant bit of the replacement field in the datum at the head of the exec pip is MOdata (603)*2. For example, if field MO (602) specifies a 2-bit replacement, and field MOdata (603) contains 6, the result is that bits 24:23 of the ALU1 atom opcode are replaced by bits 12:11 of the data at the head of the exec pipe.

Field MSZ (604) specifies whether the size fields of the ALU1 atom are to be edited and how, as shown in Table 2, below:

TABLE 2

Field MSZ

| Value | Action |
|---|---|
| 0 | Do not edit the size fields |
| 1 | Replace the SZL field |
| 2 | Replace the SZR field |

Field MSZdata (605) specifies the bit position of the replacement size field. It is ignored when field MSZ (604) requests no edit of the size fields. The bit position within the data at the head of the exec pipe is MSZdata (605)*2. For example, if field MSZ (604) requests a replacement of the SZR field, and field MSZdata (605) contains 3, then the SZR field of the ALU1 atom, bits 19:18, are replaced with bits 7:6 from the data at the head of the exec pipe.

Fields MS1 (606) and MD(607) are similar. They specify whether the source 1 (RS1) and destination (RD) register fields of the ALU1 atom are to be edited, respectively. Table 3, below, shows the possible values and associated actions:

TABLE 3

RS1 and RD fields

| Value | Action |
|---|---|
| 0 | Do not replace the relevant register field |
| 1 | Replace the relevant register field |

Fields MS1data (608) and MDdata (609) are similar. They specify the bit position within the exec data of the field used to replace the RS1 and RD register fields, respectively. They are ignored when MS1 (606) and/or MD (607) specify no editing, respectively. The bit position within the data at the head of the exec pipe is MS1data (608)*4 or MDdata (609)*4, as appropriate. Each specifies a 4-bit field within the exec data, which is interpreted as follows. Bit three of the register replacement field in the exec data is ORed into the upper three bit positions of the affected register field in the ALU1 atom. This allows preserving the upper three bits, or replacing them with ones. Bits two through zero of the register replacement field of the exec data replace the lower three bits of the affected register field in the ALU1 atom.

For example, if MS1 (606) specifies the RS1 should be replaced, and MS1data 608) contains value 2, then bits 11:8 of the datum at the head of the exec pipe are used to edit field RS1 of the ALU1 atom. Bits 10:8 of the head of the exec pipe replace the low three bits (8:6) of RS1 field in the ALU1 atom. Bit 11 of the head of the exec pipe is ORed into the upper three bits (bits 11:9) of the RS1 field in the ALU1 atom.

Field MS2 (610) specifies whether the source 2 (RS2 or IMM8) field of the ALU1 atom is to be edited and how, as shown below in Table 4:

TABLE 5

RS2/IMM8 Values

| Value | Action |
|---|---|
| 0 | Do not edit the source 2 field |
| 1 | Replace the RS2 field |
| 2 | Replace the IMM8 field with one of four (0, 1, 2, 4) short immediates |
| 3 | Replace the whole IMM8 field |

Field MS2data (611) specifies the bit position within the exec data of the data used for replacement. The bit position of the replacement field within the datum at the head of the exec pipe is defined by MS2data (611)*2. If field MS2 specifies that the source 2 field is not to be edited, MS2data (611) is ignored.

When MS2 (610) specifies that the RS2 field is to be replaced, bit 0 of MS2data (611) must be zero, and the replacement is the same as that performed by field MS1 (606) and MS1data (608), except that it applies to the RS2 field of the ALU1 atom (bits 17:12) instead of field RS1 (bits 11:6).

When MS2 (610) specifies that the IMM8 field is to be replaced, all of bits 19:12 of the ALU1 atom are replaced. When MS2 (610) has the value 3, eight bits from the exec data (starting at bit position MS2data (611)*2 are used as the replacement. When MS2 (610) has the value two, the two bits starting at bit position MS2data (611)*2 in the exec data are expanded into an eight bit immediate, as shown in Table 5, below:

TABLE 5

MS2 expansions

| Value | Action |
|---|---|
| 0 | Use 0 as the 8-bit immediate |
| 1 | Use 1 as the 8-bit immediate |
| 2 | Use 2 as the 8-bit immediate |
| 3 | Use 4 as the 8-bit immediate |

FIG. 7 illustrates an exemplary encoding 700 of an EXECF0 packet, in accordance with embodiments of the present invention.

EXECF0 is a packet that encodes editing instruction for the FPU0 atom. EXECF0 specifies that some fields and sub fields of the FPU0 atom are to be substituted with fields from the 16-bit datum at the head of the exec pipe. Unlike the EXECA1 packet, the EXECF0 packet cannot specify that the exec pipe is to be advanced after the data at the head of the pipe has been used.

The edits of the FPU0 atom are performed in the front end of the execution pipe. The FP unit is not aware that an atom has been edited in any way. It is appreciated, however, that given an execution pipeline (a common structure and method in high performance processors), there is a non-negligible latency between writing into the execution pipeline and being able to use the just-written data for edits. This is a significant benefit of a pipe, in comparison to a register. Often times, the data for successive edits can all be inserted in sequence and then extracted and used in sequence, increasing the overall throughput and decreasing the overall latency over a single-register implementation.

If there is no FPU0 atom in the same instruction as the EXECF0 packet, the EXECF0 packet has no effect and can generally consume very little power, making it a good padding option.

If all of the modifier fields in the EXECF0 packet specify "no editing," the EXECF0 packet is a low power no operation (NOP).

Fields MO (702) and MOdata (703) are similar to the fields by the same name in EXECA1, except that they affect FPU opcodes, which are in different bit positions. Hence the values of field MO (702) are given in Table 6, below:

TABLE 6

Field MO (702)

| Value | Action |
|---|---|
| 0 | Do not edit the FPU0 atom opcode |
| 1 | Replace bits 19:18 of the FPU0 atom opcode with bits from the exec pipe |
| 3 | Replace bits 21:18 of the FPU0 atom opcode with bits from the exec pipe |

Fields MS1 (706), MS1data (708), MD (707) and MDdata (709) are equivalent to the fields by the same name in the EXECA1 packet. Register replacement occurs in the same way, e.g., the three bottom bits of the exec data field replace the three bottom bits of the register specifier, and the upper bit of the exec data field is ORed into all three upper bit positions of the register specifier.

Fields MS2 (710) and MS2data (711) specify whether and how the source 2 operand of the FPU0 atom is to be edited. They are similar to the MS2 (610) and MS2data (611) fields in the EXECA1 packet (FIG. 6), but FPU0 atoms do not have 8-bit immediate values; rather they have 6-bit immediate values. Table 7 below shows the MS2 (710) values.

TABLE 7

Field MS2 (710)

| Value | Action |
|---|---|
| 0 | Do not replace the source 2 operand |
| 1 | Replace the RS2 field of the FPU0 atom |
| 2 | Replace the 6-bit immediate |

The RS2 field is replaced in the same manner that RS1 is replaced by MS1 and MS1*data*. Unlike for the EXECA1 packet, wherein the MS2*data* field is three bits wide, the MS2data in the EXECF0 packet s two bits wide and the bit position within the datum at the head of the exec pipe is defined by MS2data (711)*4.

The six-bit immediate value (bits 17:12 of the FPU0 atom) is completely replaced by bits from the datum at the head of the exec pipe. The bit position within this datum is specified by MS2data (711)*4.

FIG. 8 illustrates an exemplary encoding 800 of an EXECM0 packet, in accordance with embodiments of the present invention.

EXECM0 is a packet that encodes editing instruction for the MEM0 atom. EXECM0 specifies that some fields and sub fields of the MEM0 atom are to be substituted with fields from the 16-bit datum at the head of the exec pipe. Unlike the EXECA1 packet, the EXECM0 packet cannot specify that the exec pipe is to be advanced after the data at the head of the pipe has been used.

The edits of the MEM0 atom opcode are performed in the front end of the execution pipe. The MEM0 unit is not aware that an atom has been edited in any way. It is appreciated, however, that given an execution pipeline (a common structure and method in high performance processors), there is a non-negligible latency between writing into the execution pipeline and being able to use the just-written data for edits. This is a significant benefit of a pipe, in comparison to a register. Often times, the data for successive edits can all be inserted in sequence and then extracted and used in sequence, increasing the overall throughput and decreasing the overall latency over a single-register implementation.

If there is no MEM0 atom in the same instruction as the EXECM0 packet, the EXECM0 packet has no effect and can generally consume very little power, making it a good padding options.

If all of the modifier field sin the EXECM0 packet specify "no editing," the EXECM0 packet is a low power no operation (NOP).

The editing performed by EXECM0 is much simpler than the editing performed by EXECA1 or EXECF0 packets. The source and destination bit field positions are fixed.

Bit M0 (801) specifies whether the opcode of the MEM0 atom is to be edited or not. When M0 (801) is 0, the opcode is not edited. When M0 (801) is 1, bits 9:8 of the datum at the head of the exec pipe are used to replace bits 25:24 of the MEM0 atom.

Bit MI (802) specifies whether the INFO field of the MEM0 atom is to be edited or not. When MI (802) is 0, the INFO field is not modified. When MI (802) is 1, the INFO field (bits 23:20 of the MEM0 atom) are replaced by bits 3:0 of the datum at the head of the exec pipe.

Bit MD (803) specifies whether the RD (load destination for loads) or RDATA (store data for stores) field, e.g., the register field in bits position 5:0 of the MEM0 atom, is to be edited or not. When MD (803) is 0, the register field is not modified. When MD (803) is 1, the register field is edited according to bits 7:4 of the datum at the head of the exec pipe. The register modification is similar to that performed by EXECA1 and EXECF0 in that bits 6:4 of the exec pipe datum directly replace bits 2:0 of the MEM0 atom. Bit 7 of the exec pipe datum is ORed into bit positions 5:3 of the MEM0 atom.

Embodiments in accordance with the present invention can be practiced on computer systems utilizing microcode as well as on computer systems that do not utilize microcode. It is to be appreciated that embodiments in accordance with the present invention are well suited to very long instruction word (VLIW) computer systems. In such systems, the instruction segment can correspond to an atomic portion of the very long instruction word.

Embodiments in accordance with the present invention, system and method of instruction modification, are thus described. While the present invention has been described in particular embodiments, it should be appreciated that the present invention should not be construed as limited by such embodiments, but rather construed according to the below claims.

What is claimed is:

1. A method comprising:
accessing from memory an instruction word comprising a plurality of instruction segments and a trigger portion;
based on said trigger portion, identifying a portion of information of a memory queue for selection thereof;
based on said trigger portion, identifying a portion of one of said plurality of instruction segments;
modifying said portion of said one of said plurality of instruction segments with said portion of information of said memory queue; and
dispatching said one of said plurality of instruction segments, as modified by said modifying, to an execution unit of a processor.

2. The method of claim 1 wherein said instruction word is of a Very Long Instruction Word (VLIW) type.

3. The method of claim 2 further comprising advancing a position of said memory queue in response to a bit field of said trigger portion.

4. The method of claim 2 wherein said trigger portion and said one of said plurality of instruction segments are both specific to said execution unit.

5. The method of claim 4 wherein said execution unit is a memory execution unit.

6. The method of claim 4 wherein said execution unit is an arithmetic logic unit (ALU).

7. The method of claim 4 wherein said execution unit is a floating point unit (FPU).

8. The method of claim 4 wherein said execution unit is a branch unit.

9. The method of claim 4 wherein said identifying and said modifying are performed by microcode internal to said processor.

10. A method comprising:
accessing a machine language instruction from memory;
recognizing a trigger pattern in said machine language instruction;
identifying a portion of said machine language instruction; and
modifying said portion of said machine language instruction to form a second machine language instruction.

11. The method of claim 10 wherein said identifying comprises decoding said trigger pattern to identify said portion of said machine language instruction.

12. The method of claim 10 wherein said portion of said machine language instruction is identified according to a type of said portion.

13. The method of claim 10 wherein said portion of said machine language instruction is identified according to a location of said portion within said machine language instruction.

14. An apparatus comprising:
   means for accessing from memory an instruction word comprising a plurality of instruction segments and a trigger portion;
   means for identifying a portion of information of a memory queue for selection thereof based on said trigger portion;
   means for based on said trigger portion, identifying a portion of one of said plurality of instruction segments based on said trigger portion;
   means for modifying said portion of said one of said plurality of instruction segments with said portion of information of said memory queue; and
   means for dispatching said one of said plurality of instruction segments, as modified by said modifying, to an execution unit of a processor.

15. The apparatus of claim 14 wherein said instruction word is of a Very Long Instruction Word (VLIW) type.

16. The apparatus of claim 15 further comprising means for advancing a position of said memory queue in response to a bit field of said trigger portion.

17. The apparatus of claim 15 wherein said trigger portion and said one of said plurality of instruction segments are both specific to said execution unit.

18. The apparatus of claim 17 wherein said execution unit is a memory execution unit.

19. The apparatus of claim 17 wherein said execution unit is an arithmetic logic unit (ALU).

20. The apparatus of claim 17 wherein said execution unit is a floating point unit (FPU).

\* \* \* \* \*

UNITED STATES PATENT AND TRADEMARK OFFICE
CERTIFICATE OF CORRECTION

PATENT NO.       : 8,549,266 B2
APPLICATION NO.  : 13/155291
DATED            : October 1, 2013
INVENTOR(S)      : Banning et al.

It is certified that error appears in the above-identified patent and that said Letters Patent is hereby corrected as shown below:

On the Title Page, in item (57), under "ABSTRACT", in Column 2, Line 1, delete "A method and system of instruction modification.".

In the Specification

In Column 9, in Table 3, delete "RSI and RD fields" and insert -- RS1 and RD fields --, therefor.

In Column 9, Line 28, delete "MS1data 608)" and insert -- MS1data (608) --, therefor.

In Column 11, Line 50, delete "field sin" and insert -- fields in --, therefor.

In Column 11, Line 56, delete "M0" and insert -- MO --, therefor.

In Column 11, Line 57, delete "M0 (801) is 0," and insert -- MO (801) is 0, --, therefor.

In Column 11, Line 58, delete "M0 (801) is 1," and insert -- MO (801) is 1, --, therefor.

Signed and Sealed this
First Day of April, 2014

Michelle K. Lee
*Deputy Director of the United States Patent and Trademark Office*